(12) United States Patent
Speidell

(10) Patent No.: US 7,225,584 B1
(45) Date of Patent: Jun. 5, 2007

(54) HAND-HELD CHUM DISTRIBUTING DEVICE

(76) Inventor: William Speidell, 179 Capatola St., Port Charlotte, FL (US) 33948

( * ) Notice: Subject to any disclaimer, the term of this patent is extended or adjusted under 35 U.S.C. 154(b) by 0 days.

(21) Appl. No.: 11/519,515

(22) Filed: Sep. 12, 2006

(51) Int. Cl.
A01K 97/02 (2006.01)
(52) U.S. Cl. .......................................... 43/44.99; 43/4
(58) Field of Classification Search .................... 43/4, 43/44.99; 294/55; 473/505, 507, 508, 510–513, 473/515
See application file for complete search history.

(56) References Cited

U.S. PATENT DOCUMENTS

| | | | | |
|---|---|---|---|---|
| 220,576 | A | * | 10/1879 | Chilis ............................ 294/55 |
| 668,982 | A | * | 2/1901 | Covel ............................ 294/55 |
| 755,117 | A | * | 3/1904 | Dunn ........................... 473/508 |
| 1,271,287 | A | * | 7/1918 | Daly ............................ 294/55 |
| 1,570,632 | A | * | 1/1926 | Kideney ....................... 473/511 |
| 1,593,577 | A | * | 7/1926 | Kaiser ......................... 473/511 |
| 1,711,566 | A | * | 5/1929 | Jacobs .......................... 294/55 |
| 2,054,265 | A | * | 9/1936 | Muguerditchian ........... 141/332 |
| 2,531,551 | A | * | 11/1950 | Brecht et al. ..................... 43/4 |
| 2,670,557 | A | * | 3/1954 | Pachner .............................. 43/4 |
| 2,786,297 | A | | 3/1957 | Simmons |
| 3,106,419 | A | * | 10/1963 | Estwing ........................ 294/55 |
| 3,115,129 | A | * | 12/1963 | Merriman .................... 473/513 |
| 3,354,575 | A | * | 11/1967 | Darrow ............................. 43/4 |
| 3,357,086 | A | * | 12/1967 | Hood ............................... 43/4 |
| 3,490,501 | A | * | 1/1970 | Lefebvre et al. .............. 294/55 |
| 3,593,999 | A | * | 7/1971 | Kirk ............................ 473/515 |
| 3,671,040 | A | * | 6/1972 | Meyer et al. ................. 473/473 |
| 3,925,919 | A | * | 12/1975 | Huth ................................ 43/4 |
| 4,047,320 | A | | 9/1977 | Lee |
| 4,118,807 | A | * | 10/1978 | McCauley ......................... 43/4 |
| 4,290,221 | A | * | 9/1981 | Dotson, Sr. ....................... 43/4 |
| 4,302,017 | A | * | 11/1981 | Huqueriza ................... 473/510 |
| D267,357 | S | * | 12/1982 | Hillstrom ..................... 294/55 |
| 4,374,590 | A | * | 2/1983 | Everlith et al. ............. 473/513 |
| 4,640,540 | A | * | 2/1987 | Chisholm ..................... 294/55 |
| 5,016,383 | A | * | 5/1991 | Rizzetto .......................... 43/4 |
| 5,054,230 | A | | 10/1991 | Woodman |
| 5,067,270 | A | | 11/1991 | Garrick |
| 5,072,538 | A | * | 12/1991 | Hendricks et al. ............... 43/4 |
| 5,290,039 | A | * | 3/1994 | Cornelio ..................... 473/513 |
| 5,292,134 | A | * | 3/1994 | Schlundt et al. ............ 473/511 |

(Continued)

FOREIGN PATENT DOCUMENTS

GB 2195871 A * 4/1988

(Continued)

*Primary Examiner*—Darren W. Ark
(74) *Attorney, Agent, or Firm*—Charles J. Prescott

(57) ABSTRACT

A hand-held manually swingable chum distributing device including a substantially elongated bat-shaped housing having a hollow interior, a closed handle at a proximal end thereof and an enlarged open distal end. The distal end is defined by an opening formed preferably generally diagonally to a longitudinal axis of the housing. The hollow interior is sized to receive and hold a quantity of chum therein which is placeable or pourable into the hollow interior when the housing is held tipped upwardly and with the opening upwardly facing. An interior surface of the housing adjacent the opening is smooth and uninterrupted to allow the chum within the hollow interior to flow smoothly therefrom when the housing is held by the handle and swung. Flotation material within the handle preferably renders the device buoyant in water.

4 Claims, 4 Drawing Sheets

U.S. PATENT DOCUMENTS

| | | |
|---|---|---|
| 5,377,445 A | 1/1995 | Brannon |
| 5,465,522 A * | 11/1995 | Varda ............................... 43/4 |
| D387,514 S * | 12/1997 | Savicki ........................ 294/55 |
| 5,765,648 A * | 6/1998 | Sheehan et al. ............... 294/55 |
| 5,775,023 A * | 7/1998 | Botkins ............................ 43/4 |
| D415,662 S * | 10/1999 | Schneider .................... D7/700 |
| 6,241,629 B1 * | 6/2001 | Otto ........................... 473/507 |
| 6,598,334 B1 * | 7/2003 | Edevold .......................... 43/4 |
| 6,651,377 B1 | 11/2003 | Pleasants |
| D489,428 S | 5/2004 | McManus et al. |
| D505,178 S | 5/2005 | Smyth |
| 7,013,595 B1 | 3/2006 | Jelasco et al. |
| 2004/0029656 A1 * | 2/2004 | Vannoy ...................... 473/505 |

FOREIGN PATENT DOCUMENTS

| | | | | |
|---|---|---|---|---|
| GB | 2304514 A | * | 3/1997 |
| GB | 2332609 A | * | 6/1999 |
| GB | 2409620 A | * | 7/2005 |
| JP | 9-107857 A | * | 4/1997 |
| JP | 9-294517 A | * | 11/1997 |
| JP | 11-155449 A | * | 6/1999 |
| JP | 2000-102336 A | * | 4/2000 |
| JP | 2005-58034 A | * | 3/2005 |
| JP | 2005-73662 A | * | 3/2005 |
| JP | 2005-87151 A | * | 4/2005 |
| JP | 2005-237315 A | * | 9/2005 |
| JP | 2005-269989 A | * | 10/2005 |
| JP | 2005-287362 A | * | 10/2005 |

* cited by examiner

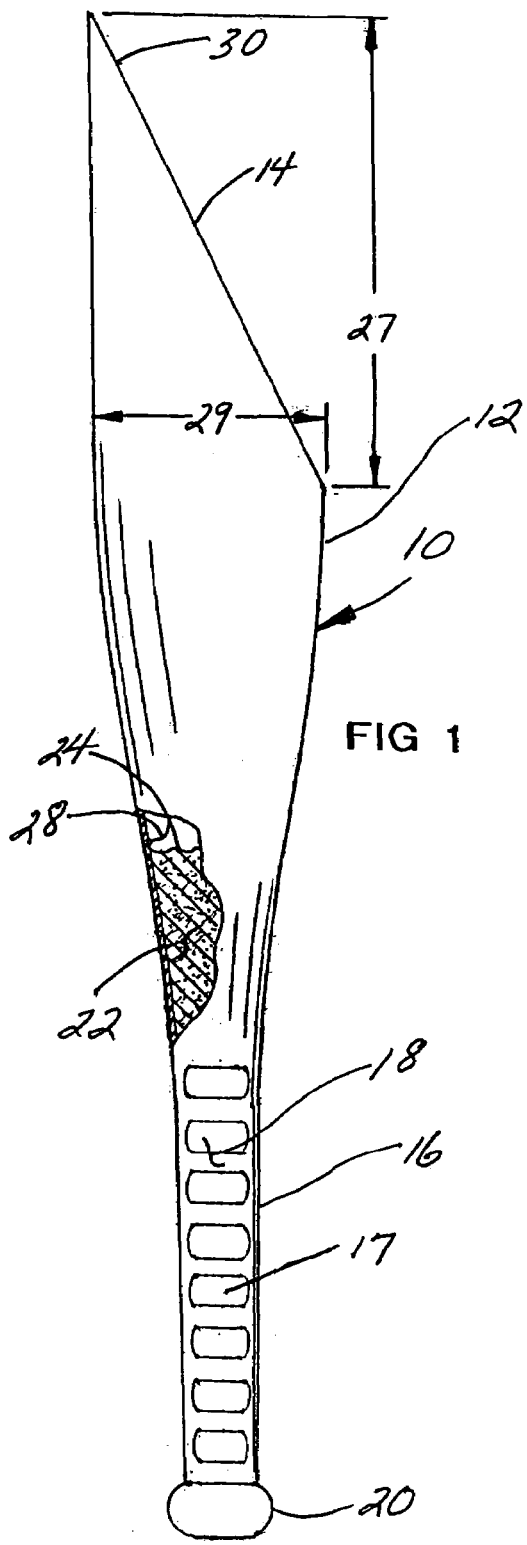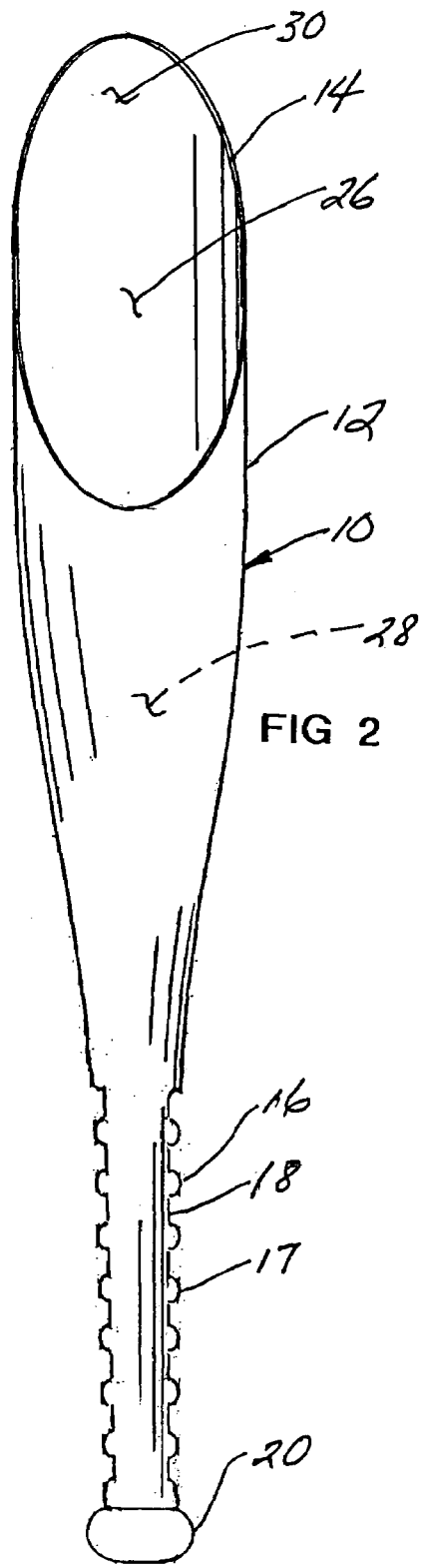

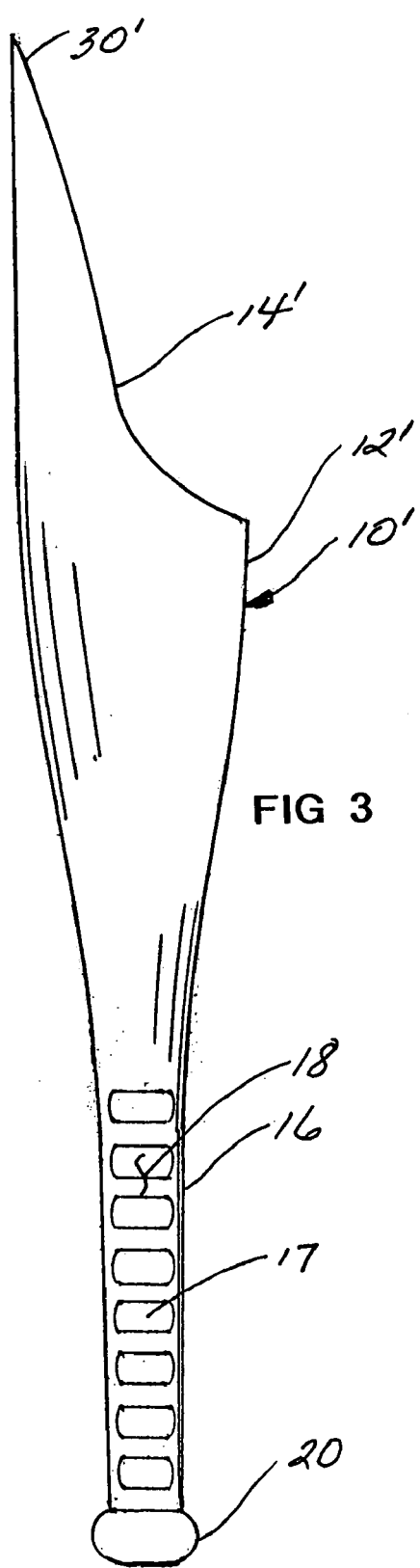
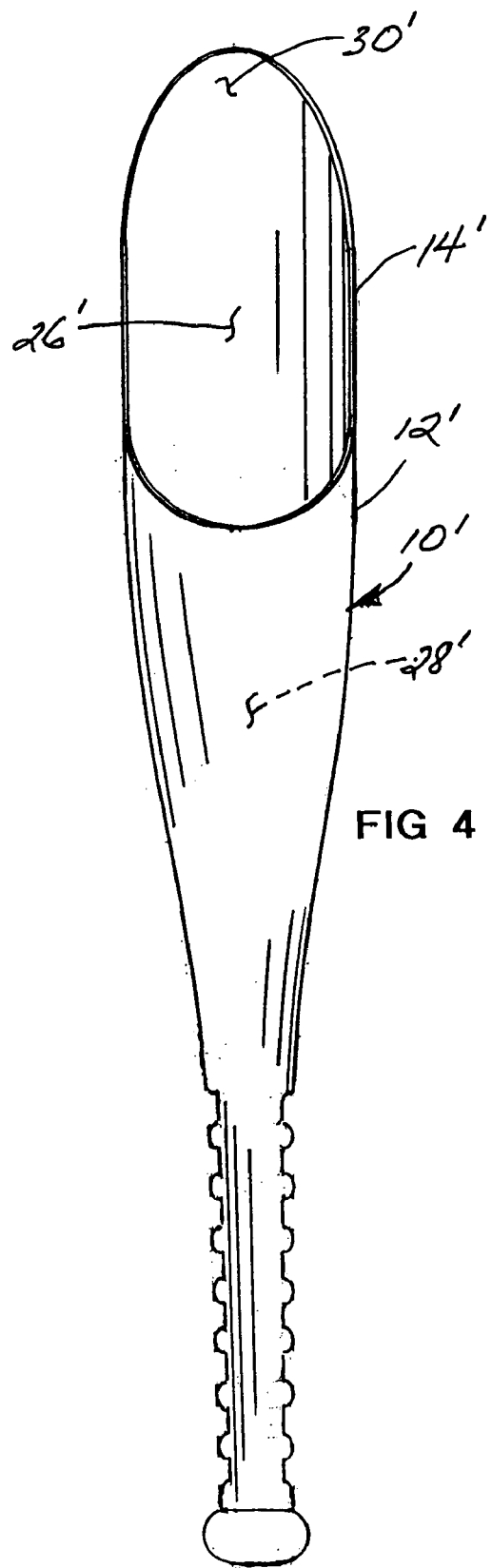
FIG 3
FIG 4

HAND-HELD CHUM DISTRIBUTING DEVICE

CROSS-REFERENCE TO RELATED APPLICATIONS

Not applicable

STATEMENT REGARDING FEDERALLY SPONSORED RESEARCH OR DEVELOPMENT

Not applicable

INCORPORATION-BY-REFERENCE OF MATERIAL SUBMITTED ON A COMPACT DISC

Not applicable

BACKGROUND OF THE INVENTION

1. Field of the Invention

This invention relates generally to fishing accessories, and more particularly to a portable hand-holdable chum distributing device for manually dispersing quantities of chum and bait across the surface of water.

2. Description of Related Art

Chumming or dispersing of live or cut bait or variations thereof is well recognized for attracting fish to the vicinity of a fishing boat, shore or dock from which a fisherman is attempting to catch fish. Chum is generally referred to as any animal matter such as fish parts, blood, fish oil and variations thereof and/or combinations of other animal parts of a similar consistency.

Chumming may be accomplished by simply pouring quantities of chum overboard onto the surface of the water and allowing it to disperse by wind, waves and current. Additionally, chum may be frozen into blocks and then attached to the back of the boat by a flexible chum line. However, a number of patented prior art devices are intended to facilitate the dispersion of live bait and chum by various means.

U.S. Pat. No. 4,047,320 to Lee discloses a bait dispenser for dispensing live bait, namely crickets, grasshoppers and the like. A design patent issued to King, et al. teaches a tubular fishing tool as shown in D462,106.

A live insect dispensing cage to be used by fisherman is taught in U.S. Pat. No. 6,651,377 to Pleasants and Jelasco, et al. teaches a chum dispensing assembly in U.S. Pat. No. 7,013,595. U.S. D489,428 to McManus, et al. is directed to a bait dispenser and U.S. Pat. No. 5,377,445 to Brannon teaches a dispenser for live baits such as crickets. Another cricket dispensing container is taught in U.S. Pat. No. 5,067,270 to Garrick.

A vial for placement on a fishing line for dispensing chum is disclosed in U.S. Pat. No. 5,054,230 and U.S. Pat. No. 2,786,297 to Simmons teaches a dispensing receptacle for dispensing bait. A tubular fishing tool is shown in U.S. Design Pat. D462,106 to King, et al. and Smyth teaches a hand caster for a hand line fishing system.

The present invention provides for a very simple and yet effective device for manually dispersing chum across the surface of the water. This device is easily loadable, preferably with the narrow handle within a conventional fishing rod holder of a boat. The device is durable, being made of preferably blow molded plastic material and is easily storable when not in use.

BRIEF SUMMARY OF THE INVENTION

This invention is directed to a hand-held manually swingable chum distributing device including a substantially elongated bat-shaped housing having a hollow interior, a closed handle at a proximal end thereof and an enlarged open distal end. The distal end is defined by an opening formed preferably generally diagonally to a longitudinal axis of the housing. The hollow interior is sized to receive and hold a quantity of chum therein which is placeable or pourable into the hollow interior when the housing is held tipped upwardly and with the opening upwardly facing. An interior surface of the housing adjacent the opening is smooth and uninterrupted to allow the chum within the hollow interior to flow smoothly therefrom when the housing is held by the handle and swung. Flotation material within the handle preferably renders the device buoyant in water.

It is therefore an object of this invention to provide a hand-held chum dispensing device which is rapidly fillable with a supply of chum or live bait for quick and convenient manual dispersion across the surface of the water.

Yet another object of this invention is to provide a durable, yet economically manufacturable chum distributing device which is supportable in a boat rod holder when being filled and is easily storable out of the way after chum has been dispersed.

Still another object of this invention is to provide a hand-held chum distributing device which is buoyant in water and which is easily orientable in a proper position by the "feel" of the handle configuration to insure that chum is most effectively dispersed over the broadest range area of water possible.

In accordance with these and other objects which will become apparent hereinafter, the instant invention will now be described with reference to the accompanying drawings.

BRIEF DESCRIPTION OF THE SEVERAL VIEWS OF THE DRAWING(S)

FIG. 1 is a side elevation broken view of the preferred embodiment of the invention.

FIG. 2 is a front elevation view of FIG. 1.

FIG. 3 is a side elevation view of an alternate embodiment of the invention.

FIG. 4 is a front elevation view of FIG. 3.

DETAILED DESCRIPTION OF THE INVENTION

Figure 5:
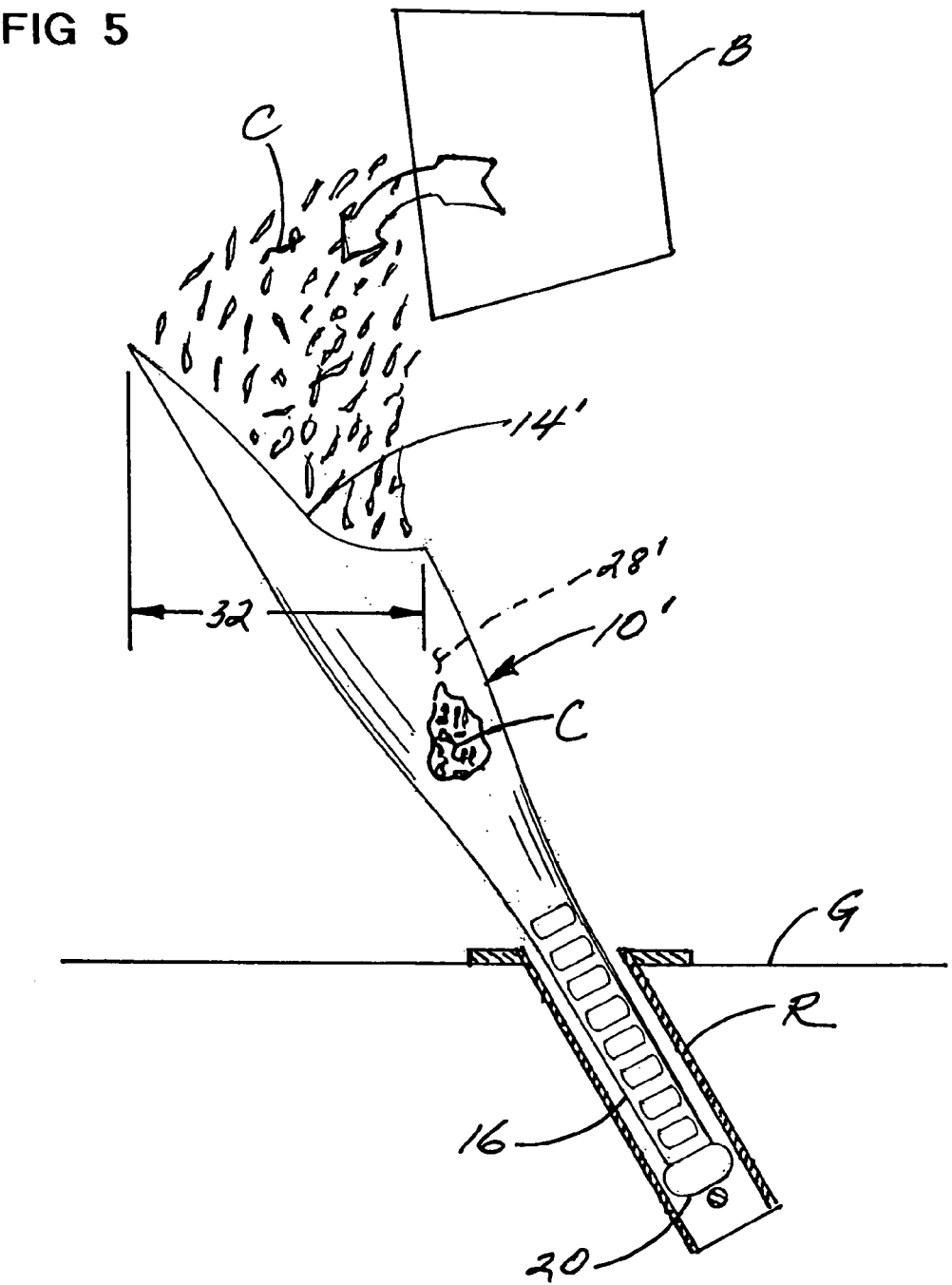
FIG. 5 is a side elevation view of the embodiment of FIG. 1 held within a fish rod holder and being filled with chum being poured from a bucket.

Referring now to the drawings, and firstly to FIGS. 1 and 2, the preferred embodiment of the invention is there shown generally at numeral 10. This device 10 is formed of thin blow molded polyethylene plastic material to form the hollow housing 12 having a hand-graspable handle 16 formed to include a series of spaced finger detents 18 formed between alternately spaced ribs 17 opposingly positioned on either side of the handle 16 and having an enlarged knob 20 at the proximal end of the housing 12. The enlarged end of the one-piece housing 12 defines a hollow interior 28 for holding a quantity of chum or live bait for manual dispersion therefrom as described herebelow. The enlarged distal end has a first width 29 which tapers down to a second width of the handle 16. An opening 26 is defined by a diagonally truncated opening margin 14 which is oriented diagonally to a longitudinal axis of the housing 12. Preferably, the opening margin 14 lies in a plane so as to define the elongated generally oval-shaped opening 26 which, as best seen in FIG. 2, has an elongated length 27 which is approximately twice that of the diameter 29 of the housing 12.

The handle 16 is preferably filled with a closed-cell foam material 22 which defines a bottom surface 24 of the hollow interior 28 to prevent chum from being clogged in the narrow handle 16. The foam 22, being closed cell, is of sufficient volume so as to render the device 10 buoyant in water Alternately, a watertight plate cemented or secured in place at 24 would serve both purposes.

As will be described more fully herebelow, the distal tongue area 30 provides a narrowing surface which achieves maximum distance distribution of the chum while other portions of the chum fall over the side edges of the opening margin 14 so as to give a broad range of chum distribution for maximum distribution thereof over the water surface. It is noted that the finger grooves 18 are oriented generally transversely to the opening 26 and the plane surface of the opening margin 14 so that a user has a sense of proper rotational orientation of the opening 26, i.e. facing in the direction of the swinging motion of the device 10.

Referring now to FIGS. 3 and 4, another embodiment of the invention is there shown generally at numeral 10' formed of plastic blow molded into the thin wall housing 12' having handle 16 and finger indents 18 as previously described. In this embodiment 10', the opening margin 14' of the opening 26' is somewhat S-shaped in exaggerated form such that the length of the narrower tongue 30' is elongated to achieve more focused and, by experimental trial, dispensing of chum from within the hollow interior thereof 28' a further distance.

Figure 6:
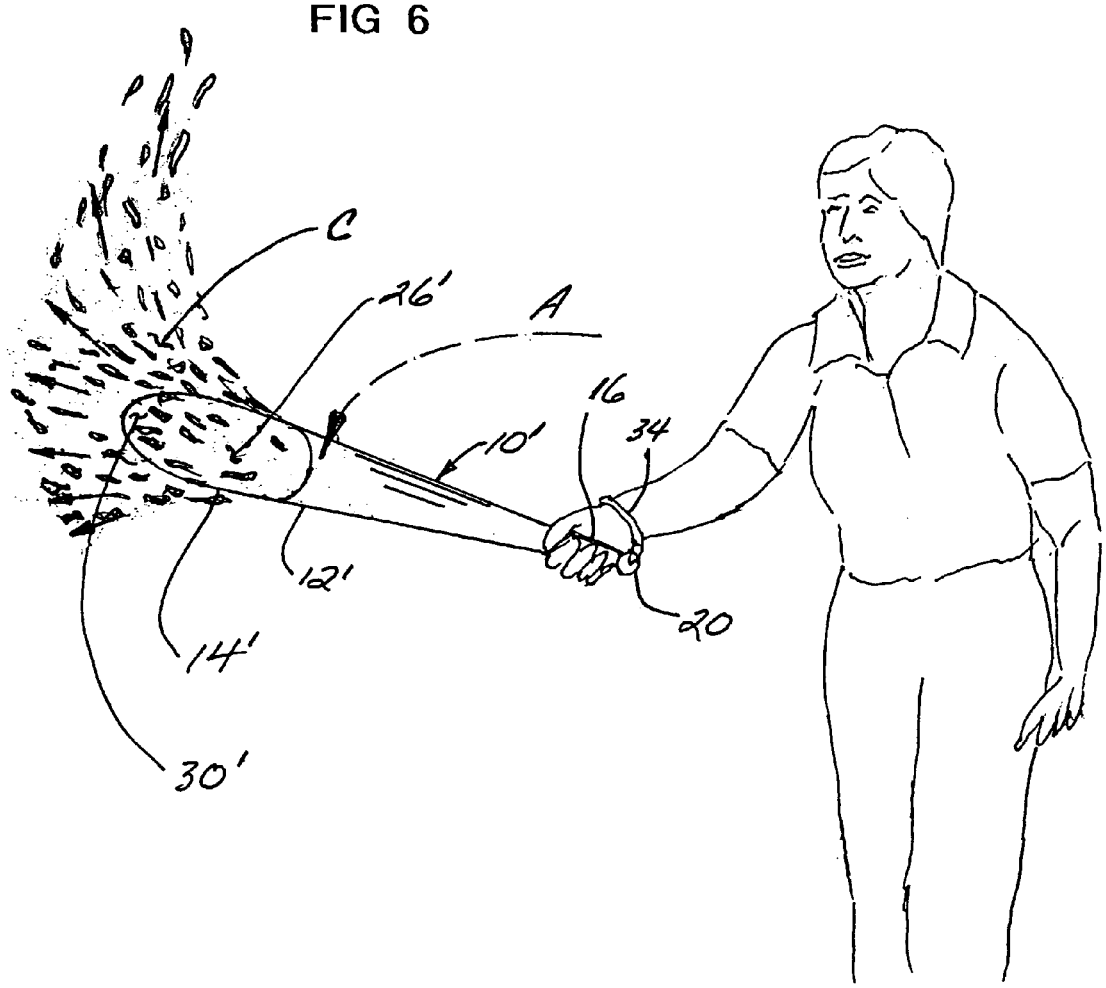
FIG. 6 is a perspective view of the embodiment of the invention shown in FIG. 5 filled with chum and being manually swung arcuately to effect chum distribution therefrom.

As seen in FIG. 5, the embodiment 10' has been temporarily held within a typical fishing rod holder R mounted to a gunnel G of a boat. The handle 16 is adapted in size by length and the enlarged proximal end 20, to slidably engage into the rod holder R and be oriented at the approximate angle indicated such that the upward projection of opening 26' is horizontally elongated at 32. This orientation of the opening margin 14' facilitates pouring of chum C from a typical bucket B into the interior volume 28' of the device 10', after which it is easily removed from the rod holder R, grasped by the handle 16 and then flung or swung generally horizontally above the water as shown in FIG. 6.

The chum C stored in the interior volume of the housing 12' then, by centrifugal force, is distributed outwardly and through an arc over the water in the direction of arrow A when the device 10' is swung manually. Note that a wrist lanyard 34 is also provided in this embodiment 10' should the handle 16 slip from the grasp of the user.

It is noted that the interior surfaces adjacent to the openings 14 and 14' are generally smooth and uninterrupted so as to facilitate the smooth outward distribution of the chum to maximize the distance that the chum is distributed from the boat or shore. Again, the tongue areas 30 and 30' are provided so as to further maximize the distance a portion of the chum is distributed or "whipped" while the remainder of the chum is distributed off of the side areas of the openings 26 or 26'.

While the instant invention has been shown and described herein in what are conceived to be the most practical and preferred embodiments, it is recognized that departures may be made therefrom within the scope of the invention, which is therefore not to be limited to the details disclosed herein, but is to be afforded the full scope of the claims so as to embrace any and all equivalent apparatus and articles.

The invention claimed is:

1. A hand-held chum distributing device comprising:
   a substantially elongated bat-shaped housing having a hollow interior, a closed handle at a proximal end thereof and an enlarged open distal end;
   said distal end having a first width tapering down to said handle having a second width which is substantially smaller than said first width;
   said distal end defined by an opening formed generally diagonally to a longitudinal axis of said housing;
   said handle including a series of spaced finger detents formed between alternately spaced ribs, said detents and said ribs being positioned alone opposing sides of said handle;
   said hollow interior sized to hold a quantity of chum therein which is placeable into said hollow interior when said housing is held with said opening upwardly facing, chum being any animal matter such as fish parts, blood, fish oil and the like or combinations of other animal parts of a similar consistency;
   an interior surface of said housing adjacent said opening being substantially smooth, straight or cylindrical, and uninterrupted wherein chum contained within said hollow interior will flow smoothly and straight therefrom when said housing is held by said handle and swung;
   only said proximal end being filled with a closed-cell foam floatation material to render said device buoyant in water and to prevent chum from becoming lodged within said handle, said hollow interior being bounded by one end of said floatation material on one side and said opening on the other side.

2. A hand-held chum distributing device as set forth in claim 1, wherein:
   said handle is adapted in size for insertion into a fishing rod holder during loading of chum into said device.

3. A method of distributing fish chum across the surface of water comprising the steps of:
   A. providing a hand-held chum distribution device including:
      a substantially elongated bat-shaped housing having a hollow interior, a closed handle at a proximal end thereof and an enlarged open distal end;
      said distal end having a first width tapering down to said handle having a second width which is substantially smaller than said first width;
      said distal end defined by an opening formed generally diagonally to a longitudinal axis of said housing;
      said handle including a series of spaced finger detents formed between alternately spaced ribs, said detents and said ribs being positioned along opposing sides of said handle;
      said hollow interior sized to hold a quantity of chum therein which is placeable into said hollow interior when said housing is held with said opening upwardly facing, chum being any animal matter such as fish parts, blood, fish oil and the like or combinations of other animal parts of a similar consistency;
      an interior surface of said housing adjacent said opening being substantially smooth and uninterrupted wherein chum contained within said hollow interior will flow smoothly therefrom when said housing is held by said handle and swung;

only said proximal end being filled with a closed-cell foam floatation material to render said device buoyant in water and to prevent chum from being lodged within said handle, the hollow interior being bounded by one end of said floatation material on one side and said opening on the other side;

B. holding said device with said opening upwardly facing and at least partially filling said hollow interior with chum;

C. grasping said handle and arcuately swinging said device to disperse the chum across the surface of the water.

4. The method of claim 3, further comprising the step of:

D. inserting said handle into a fishing rod holder to begin step B, said handle being adapted in size for insertion into the rod holder.

* * * * *